April 20, 1937.    O. K. BECKLER    2,077,735

VALVE

Filed March 11, 1935    2 Sheets-Sheet 1

Inventor
Oakley K. Beckler

By Jack A. Ashley
Attorney

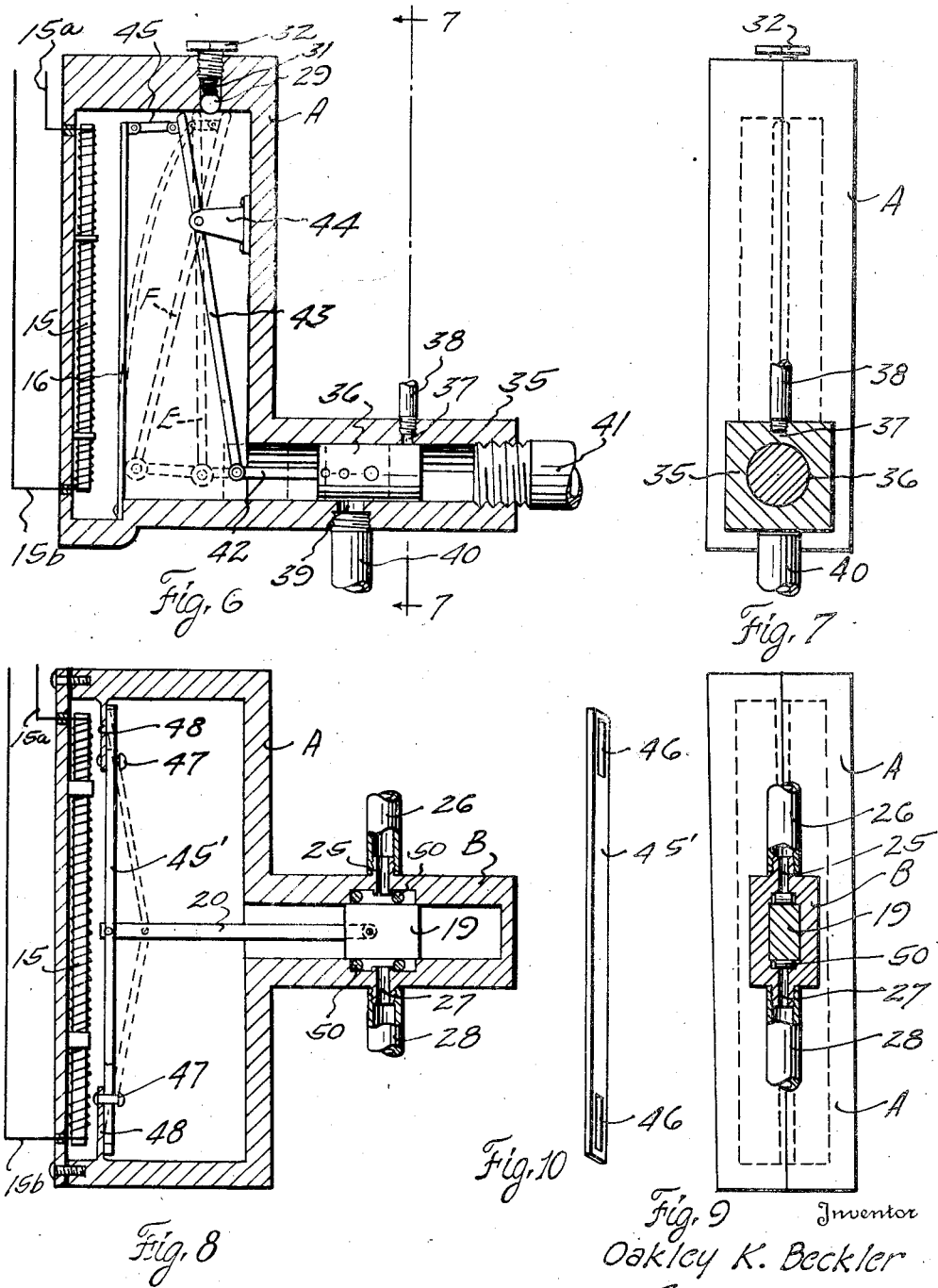

Patented Apr. 20, 1937

2,077,735

UNITED STATES PATENT OFFICE 2,077,735

VALVE

Oakley K. Beckler, Dallas, Tex., assignor of sixty-five per cent to Grove W. Harris, Marshalltown, Iowa, and J. V. Bass, Omaha, Nebr.

Application March 11, 1935, Serial No. 10,499

6 Claims. (Cl. 137—139)

This invention relates to new and useful improvements in valves.

One object of the invention is to provide an improved gas valve, which is arranged to be operated by a bi-metal element, to control the flow of gas to a burner, or other gas appliance.

An important object of the invention is to provide improved electrical means for automatically operating a valve including a bi-metal element located in juxtaposition to said means and connected with said valve, whereby when said means is energized, the element is heated to operate the valve.

Another object of the invention is to provide means located in the path of an actuating bar of a valve, whereby said bar is retarded at a predetermined point in its travel and is halted until the bar has attained sufficient force to overcome said retarding means, at which time the bar continues its travel, thereby imparting a snap action to the opening of the valve connected to said bar.

A further object of the invention is to provide a narrow, flat valve which has a snug, sliding fit in a casing, whereby a better seat and tighter seal is had, the valve being self-cleaning due to the snug sliding action during operation.

Still another object of the invention is to provide an improved valve which may be stamped out, and which has a few number of moving parts, whereby the valve may be manufactured at a minimum cost.

A construction designed to carry out the invention will be hereinafter described, together with other features of the invention.

Figure 1:
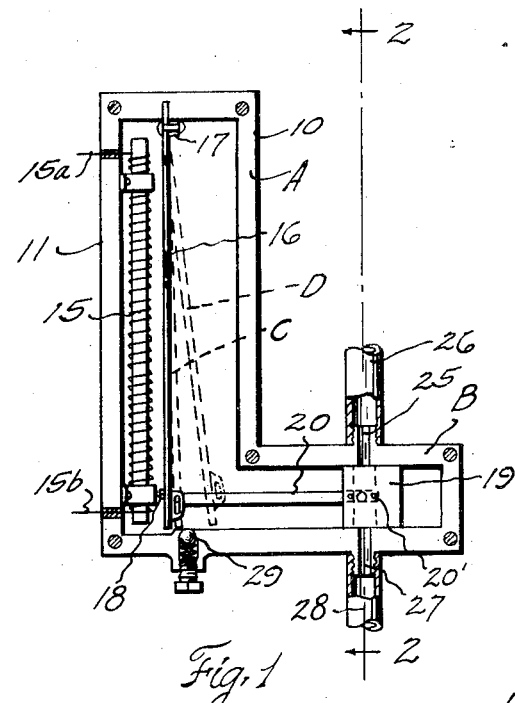
Figure 2:
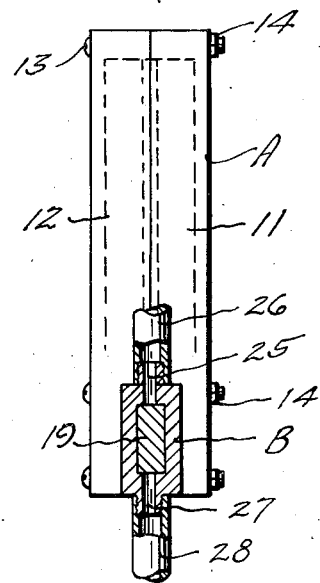
Figure 5:
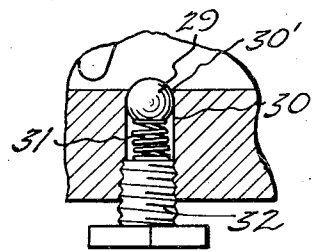
Figure 3:
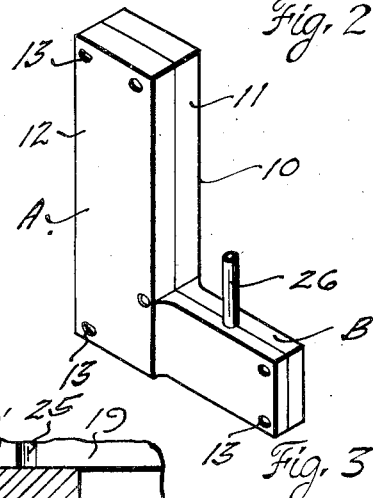
Figure 4:
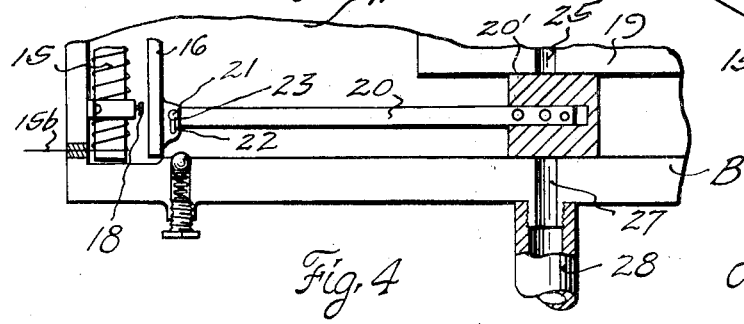

The invention will be more readily understood from a reading of the following specification and by reference to the accompanying drawings, in which an example of the invention is shown, and wherein:

Figure 1 is a vertical, sectional view of a valve, constructed in accordance with the invention, Figure 2 is a transverse, vertical sectional view, taken on the line 2—2 of Figure 1, Figure 3 is a perspective view of the same, Figure 4 is an enlarged view of the sliding valve member and its connection with the bi-metal bar, Figure 5 is a detail of the retarding means, Figure 6 is a vertical, sectional view of another form of the invention, Figure 7 is a transverse, vertical, sectional view, taken on the line 7—7 of Figure 6, Figure 8 is a vertical, sectional view of still another form of the invention, Figure 9 is a transverse vertical sectional view of the same, and Figure 10 is an enlarged isometric view of the bi-metal bar used in this form.

In the drawings the numeral 10 designates a casing which is preferably constructed of metal, but may be made of any suitable material. The casing is shown as manufactured in two vertical halves 11 and 12, which are stamped out and fitted together, being fastened to each other by transverse bolts 13 and nuts 14. The casing is substantially L-shaped and includes a vertically extending section A and a horizontally extending section B, the latter being located at the lower end of the former and at substantially a right angle thereto.

An electric coil 15 is mounted vertically on the rear wall of the section A within the casing and has electric lead wires 15a and 15b leading therefrom through the casing wall to a suitable source of supply. A bi-metal bar 16 extends contiguous to the coil within the casing and has its upper end secured to a lug 17 depending from the top of the casing. The lower end of the bar 16 is free to move forwardly within the casing, but is prevented from engaging the coil by a set screw 18 which engages one side of said bar to limit its movement. The set screw is mounted in one of the brackets 15' which secure the coil to the rear wall. It is obvious that when the coil 15 is energized, the bi-metal is heated, and the expansion of one of the metals forming said bi-metal causes the lower end of said bar to swing forwardly, as shown by dotted lines in Figure 1.

The horizontal section B is substantially rectangular in cross-section and a flat valve member 19 is slidably mounted within this section. The member has a valve rod 20 extending from its rear end and the other end of said rod extends into the section A of the casing. This end is provided with a pin 21 which extends through a slot 22 formed in an ear 23 made integral with the lower end of the bi-metal bar 16. It will be seen by observing Figure 1, the swinging of the bar 16, when heated by the energized coil, will reciprocate the valve member 19 in the section B of the casing. The valve member may be provided with three holes 20' (Figure 4), whereby the rod 20 may be fastened thereto in various positions, whereby the travel of the valve member within the section B may be varied.

A port 25 is provided in the upper end of the section B and an inlet supply pipe 26 is connected to this port. The pipe may have its other end connected to the gas supply. A similar port 27 is formed in the bottom of the section B directly opposite the port 25 and has an outlet pipe 28 connected thereto. The other end of the pipe 28 connects with the gas burner, or other appliance (not shown). With the coil 15 deenergized and the bi-metal bar 16 in a vertical position, the valve member 19 is in a position directly opposite the ports 25 and 27, whereby the ports are closed and gas cannot pass from one to the other (full lines in Figure 1). When the coil is energized, the bi-metal bar 16 is heated and its lower end starts to move forwardly toward the section B of the casing, thereby moving the valve member 19 forwardly.

As the bar moves to the position shown in dotted line C in Figure 1, its lower end strikes a ball 29, which is located in its path and which halts further movement of said bar. The ball is mounted at the upper end of a vertically extending opening 30 in the bottom of the casing and is constantly forced upwardly by a coiled spring 31. The spring is retained in constant engagement with the underside of the ball by an adjusting screw 32 threaded into the lower end of the opening 30. The ball is prevented from being forced out of the upper end of the opening 30 by lips 30' formed by reducing the diameter of said opening at its extreme upper end. With this arrangement, only the upper end of the ball projects into the casing in the path of the lower end of the bar 16.

As said bar first commences its swing, it will strike the upper edge of the ball. Due to the spring tension beneath said ball, the bar is halted in its swing. At this time the valve member 19 is still holding the ports 25 and 27 closed. However, continued heating of the bi-metal bar increases its expansion and gives it greater force. When this force is sufficiently strong to overcome the tension of the spring 31 beneath the ball, the end of the bar depresses the ball which permits the swing of said bar to continue. Due to the stored up force within the bar, said bar will immediately swing its full distance, as shown by dotted lines D in Figure 1. This latter swinging is rapid, which imparts a rapid movement to the valve member 19, causing said member to move from between the ports 25 and 27 and permit gas to flow from the former to the latter. So long as the coil 15 remains energized, the bar 16 and other parts remain in this position, and the gas flows from the supply line 26 to the point of consumption. As soon as the coil is de-energized, the bi-metal bar returns to its original or normal position, moving the valve member 19 to close the ports.

The flat, blade-like valve member provides a self-cleaning valve, for it is obvious that due to the sliding fit, any dirt or extraneous matter adhering to the sides of said member will be sheared, or scraped off during reciprocation. The spring-pressed ball 29, which halts the travel of the bar 16 until it has been heated sufficiently to readily swing to its furthermost position, provides for a snap action in opening the ports. It is obvious that by varying the spring tension, the amount of stored up force or strength in the bar necessary to depress the ball, may be controlled.

In Figures 6 and 7, I have shown another form of the invention. This type is particularly adapted for use in heavy duty work and may be cast instead of stamped. In this form the section B of the casing 10 is eliminated and a cylinder 35 is substituted therefor. The cylinder has a piston 36 slidable therein and normally the piston closes a port 37 in the top of the cylinder, which has a lead pipe 38 connected thereto. The other end of the pipe connects to the pilot light of a gas burner (not shown). The piston also serves to close a port 39 which has connected thereto a pipe 40 leading to the burner. It is pointed out that the ports are not in vertical alinement, the upper port being nearer the outer end of the cylinder. A gas inlet pipe 41 is connected into the outer end of the cylinder. It is obvious that with the piston in the position shown in Figure 6, both ports 37 and 39 are closed, and gas entering from the inlet pipe cannot enter either port. However, as the piston moves inwardly toward the section A of the casing, the port 37 is first uncovered to admit gas to the pilot, whereby the pilot flame is increased. Further movement of the piston uncovers the port 39 which admits gas to the burner (not shown).

For reciprocating the piston, a connecting rod 42 extends rearwardly therefrom and has its end pivotally connected to a vertical actuating lever 43. The lever is pivoted near its upper end to a bracket 44 secured on the inner front wall of the section A of the casing 10. The bi-metallic bar 16 has its upper end free in this form, having its lower end secured to the casing. The upper end of said bar is connected to the lever by a link 45. When the coil 15 is energized the bar is swung to swing the upper end of the lever forwardly in the casing 10, which causes the lower end of the lever to swing rearwardly to uncover the ports 37 and 39. In this form, the ball 29 is mounted in the top of the casing 10 in the path of the upper end of the lever 43. The ball is positioned so that the arm 43 is permitted to swing to the position shown in dotted lines E, which is far enough to uncover the port 37 to the pilot. The swing of the arm is halted at this point until the bar 16 is heated sufficiently to overcome the tension of the spring 31 bearing against the ball. When sufficiently heated, the bar 16 swings the lever to the position shown in dotted lines F in Figure 6, which moves the piston to uncover the port 39 and permit gas to flow to the gas burner (not shown). Thus, it is obvious that the port 37 is first uncovered to increase the pilot flame and after a short interval the port 39 to the burner is opened. The length of this interval is controlled by the tension of the spring 31 on the ball 29.

In Figures 8 and 9, I have shown still another form of the invention. In this form, the section B of the casing is located centrally of the section A instead of at the lower end. All the parts are similar to the parts shown in the form in Figures 1 to 4, except the bi-metal bar 16. In place of this bar, another bar 45' is substituted therefor. The bar 45' is provided with slots 46 at each end and these slots receive headed pins 47 which are secured to vertical arms 48 extending into the casing from the top and bottom thereof. It is obvious that the bar 45' may move a limited distance on the pins. The valve rod 20, which has one end secured to the valve member has its other end fastened to the central portion of the bar 45'. It is obvious that when the coil 15 is energized and the bar 45' is heated, it will expand and move to the position shown in dotted lines in Figure 8, which will move the valve member 19 to uncover the ports 25 and 27. This type is also adapted for heavy duty and may be cast instead of stamped. When used for heavy work, the valve member may have rollers 50 above and below the same, whereby sliding of said member will be facilitated.

What I claim and desire to secure by Letters Patent, is:

1. A valve comprising, a casing, a valve member movable in the casing, a bi-metallic element movable within the casing and connected with said member, an electrical coil located in juxtaposition to said element, means for energizing said coil to heat the element whereby said element is expanded to actuate the valve member, and means for retarding the bi-metallic element at a predetermined point in its movement, whereby said element is halted until it overcomes said retarding means, thereby imparting a snap action to the actuation of said valve member.

2. A valve comprising, a casing, a cylinder communicating with said casing and having an inlet and a pair of outlet ports therein, a piston slidable in the cylinder and arranged to cover said outlet ports, an actuating bar within the casing successively connected with the piston for sliding the same, a bi-metallic element movable within the casing and connected with the bar, and means for heating said element to expand and move the same, whereby the actuating bar is operated to slide the valve to uncover said outlet ports.

3. A valve comprising, a casing, a cylinder communicating with said casing and having an inlet and a pair of outlet ports therein, a piston slidable in the cylinder and arranged to successively cover said outlet ports, an actuating bar within the casing connected with the piston for sliding the same, a bi-metallic element movable within the casing and connected with the bar, means for heating said element to expand and move the same, whereby the actuating bar is operated to slide the valve to uncover said outlet ports, and means for momentarily halting the movement of said actuating bar and element after one of the outlet ports is uncovered, whereby the sliding of said piston is momentarily halted before completing its movement to uncover the second outlet port.

4. A valve including, an elongated casing, an electric heating coil mounted in the casing, an elongated bi-metallic bar extending longitudinally of and adjacent the coil, said bar being movable under the influence of said coil, a valve member, an operating connection between the valve member and the bar, and means directly engaged by the bi-metallic bar for imparting a snap action to the valve.

5. A valve comprising, an elongated valve casing having an angular extension provided with inlet and outlet ports, a valve member movable in the casing extension for opening and closing the ports thereof, an electric heating element mounted in the elongated portion of the casing, a bi-metallic bar movably supported in the casing longitudinally of said element, a separate connection between the bar and the valve, and resilient means free from connection with the valve actuating parts but disposed in the path of one of the valve operating parts for retarding movement at a predetermined point, thereby imparting a snap action to the valve member.

6. A valve including an elongated casing, an electric heating coil disposed within the casing along one wall thereof, a bi-metallic bar movably disposed longitudinally in the casing contiguous to the coil and exteriorly thereof, a valve housing having inlet and outlet ports, a valve movable in the housing to open and close the ports thereof, an actuating connection between the bi-metallic bar and the valve, and means directly engaged by one end of the bi-metallic bar for retarding said bar and imparting a snap action to the valve.

OAKLEY K. BECKLER.